United States Patent
Denton et al.

(10) Patent No.: US 10,319,076 B2
(45) Date of Patent: Jun. 11, 2019

(54) PRODUCING HIGHER-QUALITY SAMPLES OF NATURAL IMAGES

(71) Applicant: Facebook, Inc., Menlo Park, CA (US)

(72) Inventors: Emily Denton, New York, NY (US); Soumith Chintala, Jersey City, NJ (US); Arthur David Szlam, New York, NY (US); Robert D. Fergus, Tuxedo Park, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/624,429

(22) Filed: Jun. 15, 2017

(65) Prior Publication Data
US 2017/0365038 A1 Dec. 21, 2017

Related U.S. Application Data

(60) Provisional application No. 62/351,257, filed on Jun. 16, 2016.

(51) Int. Cl.
*G06T 5/00* (2006.01)

(52) U.S. Cl.
CPC ...... *G06T 5/00* (2013.01); *G06T 2207/20016* (2013.01)

(58) Field of Classification Search
USPC .................................................. 345/428, 589
See application file for complete search history.

(56) References Cited

U.S. PATENT DOCUMENTS

| | | | | |
|---|---|---|---|---|
| 2008/0253678 A1* | 10/2008 | Li | ........................... | G06K 9/40 382/260 |
| 2009/0169102 A1* | 7/2009 | Zhang | .................. | G06T 3/4061 382/167 |

(Continued)

*Primary Examiner* — Kimbinh T Nguyen
(74) *Attorney, Agent, or Firm* — Baker Botts L.L.P.

(57) ABSTRACT

In one embodiment, a method includes accessing a plurality of generative adversarial networks (GANs) that are each applied to a particular level k of a Laplacian pyramid. Each GAN may comprise a generative model $G_k$ and a discriminative model $D_k$. At each level k, the generative model $G_k$ may take as input a noise vector $z_k$ and may output a generated image $\tilde{h}_k$. At each level k, the discriminative model $D_k$ may take as input either the generated image $\tilde{h}_k$ or a real image $h_k$, and may output a probability that the input was the real image $h_k$. The method may further include generating a sample image $\tilde{I}_k$ from the generated images $\tilde{h}_k$, wherein the sample image is based on the probabilities outputted by each of the discriminative models $D_k$ and the generated images $\tilde{h}_k$. The method may further include providing the sample image $\tilde{I}_k$ for display.

20 Claims, 4 Drawing Sheets

(56) References Cited

U.S. PATENT DOCUMENTS

| | | | |
|---|---|---|---|
| 2010/0142790 A1* | 6/2010 | Chang | G06T 5/002 382/132 |
| 2010/0183217 A1* | 7/2010 | Seung | G06K 9/342 382/156 |
| 2011/0243438 A1* | 10/2011 | Hoppe | G06T 3/4007 382/167 |
| 2014/0064636 A1* | 3/2014 | Zhang | G06T 3/4061 382/284 |
| 2016/0148359 A1* | 5/2016 | Gnedin | G06T 5/20 382/264 |
| 2016/0163021 A1* | 6/2016 | al-Salem | G06K 9/6201 382/299 |
| 2017/0011280 A1* | 1/2017 | Soldevila | G06K 9/00362 |
| 2017/0178309 A1* | 6/2017 | Rakhshanfar | G06T 7/0002 |
| 2017/0256033 A1* | 9/2017 | Tuzel | G06T 5/00 |
| 2018/0082172 A1* | 3/2018 | Patel | G06N 3/0472 |
| 2018/0130180 A1* | 5/2018 | Wang | G06T 3/4053 |

* cited by examiner

PRODUCING HIGHER-QUALITY SAMPLES OF NATURAL IMAGES

PRIORITY

This application claims the benefit, under 35 U.S.C. § 119(e), of U.S. Provisional Patent Application No. 62/351,257, filed 16 Jun. 2016, which is incorporated herein by reference.

TECHNICAL FIELD

This disclosure generally relates to image generation and processing.

BACKGROUND

In machine learning, a convolutional neural network (e.g., convnet) is a type of feed-forward artificial neural network in which the connectivity pattern between its neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. Convolutional networks were inspired by biological processes and are variations of multilayer perceptrons designed to use minimal amounts of preprocessing. They have wide applications in image and video recognition, recommender systems and natural language processing.

SUMMARY OF PARTICULAR EMBODIMENTS

Particular embodiments provide a generative parametric model capable of producing high quality samples of natural images. Such embodiments may use a cascade of convolutional networks within a Laplacian pyramid framework to generate images in a coarse-to-fine fashion. At each level of the pyramid, a separate generative convnet model is trained using a Generative Adversarial Nets (GAN) approach. Samples drawn from a model used in particular embodiments may be of higher quality than previous approaches. For example, such samples may be more likely to be mistaken for real images by human evaluators, compared with previous GAN models.

Building a good generative model of natural images has been a fundamental problem within computer vision. However, images are complex and high dimensional, making them hard to model well, despite extensive efforts. Given the difficulties of modeling entire scene at high-resolution, most existing approaches instead generate image patches. In contrast, particular embodiments present an approach that is able to generate plausible looking scenes at 32×32 and 64×64. To do this, the multi-scale structure of natural images is used to build a series of generative models, each of which captures image structure at a particular scale of a Laplacian pyramid. This strategy breaks the original problem into a sequence of more manageable stages. At each scale a convolutional network-based generative model is trained using a Generative Adversarial Networks (GAN) approach. Samples are drawn in a coarse-to-fine fashion, commencing with a low-frequency residual image. The second stage samples the band-pass structure at the next level, conditioned on the sampled residual. Subsequent levels continue this process, always conditioning on the output from the previous scale, until the final level is reached. Thus drawing samples is an efficient and straightforward procedure: taking random vectors as input and running forward through a cascade of deep convolutional networks (convnets) to produce an image.

Deep learning approaches have proven highly effective at discriminative tasks in vision, such as object classification. However, the same level of success has not been obtained for generative tasks, despite numerous efforts. Against this background, particular embodiments may make advancements that are straightforward to train and sample from. The resulting samples may show a higher level of visual fidelity, indicating a better density model than traditional methods.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
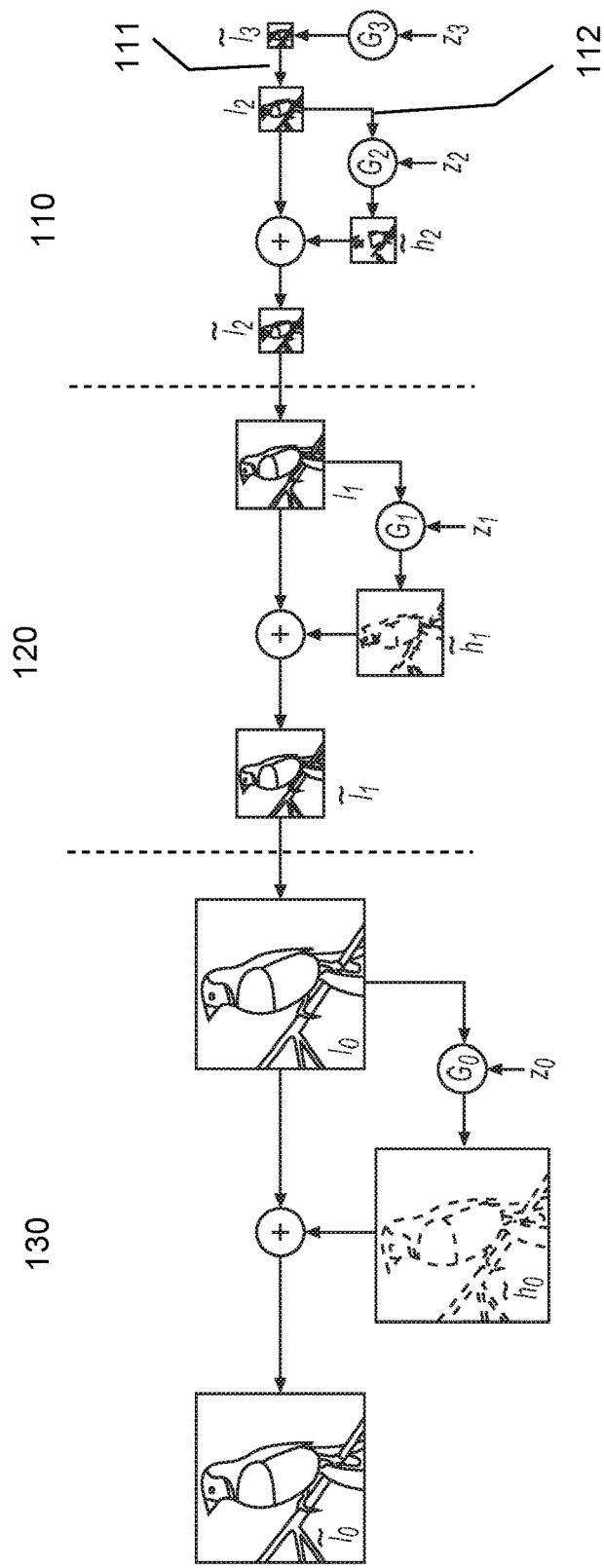
FIG. 1 illustrates an example sampling procedure for an example Laplacian generative adversarial network model.

Particular embodiments provide a generative parametric model capable of producing high quality samples of natural images. Such embodiments may use a cascade of convolutional networks within a Laplacian pyramid framework to generate images in a coarse-to-fine fashion. At each level of the pyramid, a separate generative convnet model is trained using a Generative Adversarial Nets (GAN) approach. Samples drawn from a model used in particular embodiments may be of higher quality than previous approaches. For example, such samples may be more likely to be mistaken for real images by human evaluators, compared with previous GAN models.

Building a good generative model of natural images has been a fundamental problem within computer vision. However, images are complex and high dimensional, making them hard to model well, despite extensive efforts. Given the difficulties of modeling entire scene at high-resolution, most existing approaches instead generate image patches. In contrast, particular embodiments present an approach that is able to generate plausible looking scenes at 32×32 and 64×64. To do this, the multi-scale structure of natural images is used to build a series of generative models, each of which captures image structure at a particular scale of a Laplacian pyramid. This strategy breaks the original problem into a sequence of more manageable stages. At each scale a convolutional network-based generative model is trained using a Generative Adversarial Networks (GAN) approach. Samples are drawn in a coarse-to-fine fashion, commencing with a low-frequency residual image. The second stage samples the band-pass structure at the next level, conditioned on the sampled residual. Subsequent levels continue this process, always conditioning on the output from the previous scale, until the final level is reached. Thus drawing samples is an efficient and straightforward procedure: taking random vectors as input and running forward through a cascade of deep convolutional networks (convnets) to produce an image.

Deep learning approaches have proven highly effective at discriminative tasks in vision, such as object classification. However, the same level of success has not been obtained for generative tasks, despite numerous efforts. Against this background, particular embodiments may make advancements that are straightforward to train and sample from. The resulting samples may show a higher level of visual fidelity, indicating a better density model than traditional methods.

Generative image models are well studied, falling into two main approaches: non-parametric and parametric. The former copy patches from training images to perform, for example, texture synthesis or super-resolution. More ambitiously, entire portions of an image can be in-painted, given a sufficiently large training dataset. Early parametric models addressed the easier problem of texture synthesis, making use of a steerable pyramid wavelet representation, similar to use of a Laplacian pyramid. For image processing tasks, models based on marginal distributions of image gradients are effective, but may only be designed for image restoration rather than being true density models (so cannot sample an actual image). Very large Gaussian mixture models and sparse coding models of image patches may also be used but suffer the same problem.

A wide variety of deep learning approaches involve generative parametric models. Restricted Boltzmann machines, Deep Boltzmann machines, and Denoising auto-encoders have a generative decoder that reconstructs the image from the latent representation. Variational auto-encoders provide probabilistic interpretation which facilitates sampling. However, for all these methods convincing samples may have only been shown on simple datasets such as MNIST and NORB, possibly due to training complexities which limit their applicability to larger and more realistic images.

Particular embodiments build upon traditional GAN approaches, which may work well for smaller images (e.g. MNIST) but may be unable directly handle large ones, unlike particular embodiments discussed in the present disclosure. Older approaches propose conditional versions of the GAN model. They show MNIST samples, and focus on frontal face images. Particular embodiments may use several forms of conditional GAN model but is much more ambitious in its scope.

A traditional GAN approach is a framework for training generative models, which is discussed in the context of image data. The method may pit two networks against one another: a generative model G that captures the data distribution and a discriminative model D that distinguishes between samples drawn from G and images drawn from the training data. In particular embodiments, both G and D are convolutional networks. The former takes as input a noise vector z drawn from a distribution $p_{Noise}$ (z) and outputs an image $\tilde{h}$. The discriminative network D takes an image as input stochastically chosen (with equal probability) to be either $\tilde{h}$—as generated from G, or h—a real image drawn from the training data $p_{Data}$ (h). D outputs a scalar probability, which is trained to be high if the input was real and low if generated from G. A minimax objective is used to train both models together:

$$\min_G \max_D E_{h \sim p_{Data}(h)}[\log D(h)] + (E_{z \sim p_{Noise}(z)}[\log(1-D(G(z)))]. \quad (1)$$

This encourages G to fit $p_{Data}$ (h) so as to fool D with its generated samples $\tilde{h}$. Both G and D are trained by back-propagating the loss in Eqn. 1 through their respective models to update the parameters.

The conditional generative adversarial net (CGAN) may be an extension of the GAN where both networks G and D receive an additional vector of information l as input. This may contain information about the class of the training example h. The loss function thus becomes:

$$\min_G \max_D E_{h,l \sim p_{Data}(h,l)}[\log D(h,l)] + (E_{z \sim p_{Noise}(z), l \sim p_l(l)}[\log(1-D(G(z,l),l))], \quad (2)$$

where $p_l(l)$ is, for example, the prior distribution over classes. This model may allow the output of the generative model to be controlled by the conditioning variable l. In particular embodiments, l will be another image, generated from another CGAN model.

The Laplacian pyramid is a linear invertible image representation consisting of a set of band-pass images, spaced an octave apart, plus a low-frequency residual. Formally, let d(.) be a downsampling operation which blurs and decimates a j×j image I, so that d(I) is a new image of size j/2×j/2. Also, let u(.) be an upsampling operator which smoothes and expands I to be twice the size, so u(I) is a new image of size 2j×2j. A Gaussian pyramid G(I)=[$I_0$, $I_1$, ..., $I_K$] is built, where $I_0$=I and $I_K$ is k repeated applications of d(.) to I. K is the number of levels in the pyramid, selected so that the final level has very small spatial extent (≤8×8 pixels).

FIG. 1 illustrates an example sampling procedure for an example LAPGAN model. In particular embodiments, the recurrence may begin by setting $\tilde{I}_{K+1}=0$ and using the model at the final level $G_K$ to generate a residual image (e.g., sample image) $\tilde{I}_K$ using noise vector $z_k$: $\tilde{I}_K = G_K(z_K)$. Note that models at all levels except the final may be conditional generative models that take an upsampled version of the current image $\tilde{I}_{k+1}$ as a conditioning variable, in addition to the noise vector $z_k$. FIG. 1 shows this procedure in action for a pyramid with K=3 using 4 generative models to sample a 64×64 image. Particular embodiments start with a noise sample $z_3$ at level 110 and use a generative model $G_3$ to generate $\tilde{I}_3$. This is upsampled at arrow 111 and then used as the conditioning variable at $l_2$ at arrow 112 for the generative model at the next level, $G_2$. Together with another noise sample $z_2$, $G_2$ generates a difference image $h_2$ which is added to $l_2$ to create $\tilde{I}_2$. This process repeats across two subsequent levels 120 and 130 to yield a final full resolution sample $\tilde{I}_0$.

Figure 2:
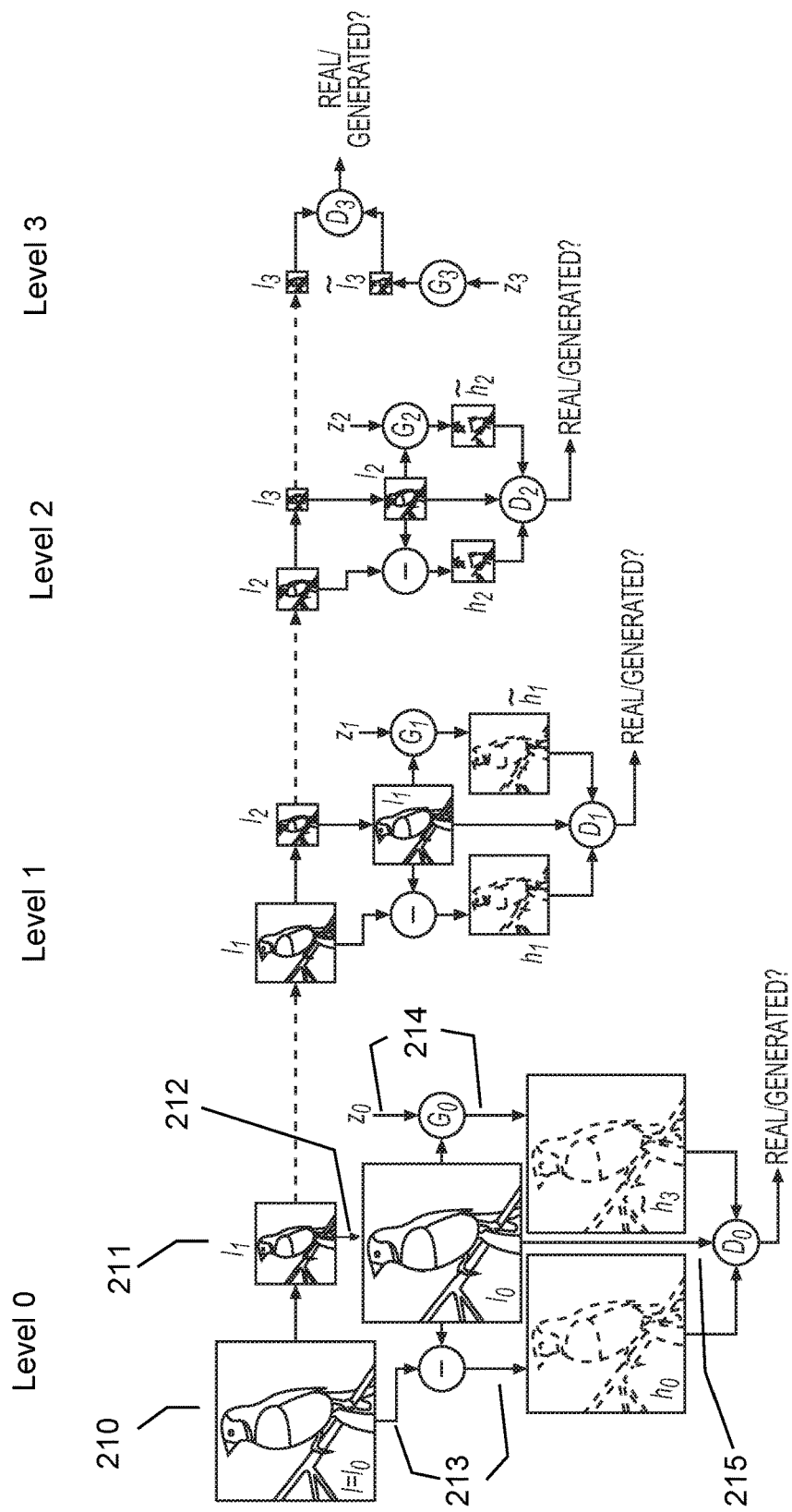
FIG. 2 illustrates an example training procedure for an example Laplacian generative adversarial network model.

FIG. 2 illustrates an example training procedure for an example LAPGAN model. Starting with a 64×64 input image I from a training set 210: (i) particular embodiments take $I_0$=I and blur and downsample it by a factor of two at arrow 211 to produce $I_1$; (ii) particular embodiments upsample $I_1$ by a factor of two at arrow 212, giving a low-pass version $l_0$ of $I_0$; (iii) with equal probability $l_0$ is used to create either a real or a generated example for the discriminative model $D_0$. In the real case at arrows 213, particular embodiments compute high-pass $h_0$=$I_0$−$l_0$ which is input to $D_0$ that computes the probability of it being real vs generated. In the generated case arrows 214, the generative network $G_0$ may receive as input a random noise vector $z_0$ and $l_0$. It may output a generated high-pass image $\tilde{h}_0$=$G_0$($z_0$, $l_0$), which may be input to $D_0$. In both the real/generated cases, $D_0$ may also receive $l_0$ at arrow 215. Optimizing Eqn. 2, $G_0$ thus may learn to generate realistic high-frequency structure $\tilde{h}_0$ that may be consistent with the low-pass image $l_0$. The same procedure may be repeated at levels 1 and 2, using $I_1$ and $I_2$. Note that the models at each level are trained independently. At level 3, $I_3$ is an 8×8 image, simple enough to be modeled directly with standard GANs $G_3$ & $D_3$.

In particular embodiments, the coefficients $h_k$ at each level k of the Laplacian pyramid L(I) may be constructed by taking the difference between adjacent levels in the Gaussian pyramid, upsampling the smaller one with u(.) so that the sizes are compatible:

$$h_k=\mathcal{L}(I)=G_k(I)-u(G_{k+1}(I))=I_k-u(I_{k+1}). \quad (3)$$

Intuitively, each level may capture image structure present at a particular scale. The final level of the Laplacian pyramid $h_K$ may not be a difference image, but may be a low-frequency residual equal to the final Gaussian pyramid level, i.e. $h_K$=$I_K$. Reconstruction from a Laplacian pyramid coefficients $h_1$, . . . , $h_K$ may be performed using the backward recurrence:

$$I_k=u(I_{k+1})h_k, \quad (4)$$

which may be started with $I_K$=$h_K$ and the reconstructed image may be I=$I_o$. In other words, starting at the coarsest level, particular embodiments repeatedly upsample and add the difference image h at the next finer level until the full resolution image may be produced.

Particular embodiments combine the conditional GAN model with a Laplacian pyramid representation. The model may best be explained by first considering the sampling procedure. Following training (discussed below), particular embodiments may have a set of generative convnet models {$G_O$, . . . , $G_K$}, each of which may capture the distribution of coefficients $h_k$ for natural images at a different level of the Laplacian pyramid. Sampling an image may be understood to be akin to the reconstruction procedure in Eqn. 4, except that the generative models may be used to produce the $h_k$'s:

$$\tilde{I}_k=u(\tilde{I}_{k+1})+\tilde{h}_k=u(\tilde{I}_{k+1})+G_k(z_k,u(\tilde{I}_{k+1})). \quad (5)$$

In particular embodiments, the recurrence may begin by setting $\tilde{I}_{K+1}$=0 and using the model at the final level $G_K$ to generate a residual image (e.g., sample image) $\tilde{I}_K$ using noise vector $z_k$:$\tilde{I}_K$=$G_K(z_K)$. Note that models at all levels except the final may be conditional generative models that take an upsampled version of the current image $\tilde{I}_{k+1}$ as a conditioning variable, in addition to the noise vector $z_k$. FIG. 1 shows this procedure in action for a pyramid with K=3 using 4 generative models to sample a 64×64 image.

In particular embodiments, the generative models {$G_O$, . . . , $G_K$} may be trained using the CGAN approach at each level of the pyramid. Specifically, particular embodiments construct a Laplacian pyramid from each training image I. At each level particular embodiments may make a stochastic choice (with equal probability) to either (i) construct the coefficients $h_k$ either using the standard procedure from Eqn. 3, or (ii) generate them using $G_k$:

$$\tilde{h}_k=G_k(z_k,u(I_{k+1})). \quad (6)$$

In particular embodiments, $G_k$ may be a convnet which uses a coarse scale version of the image $l_k$=u($I_{k+1}$) as an input, as well as noise vector $Z_k$. $D_k$ may take as input $h_k$ or $\tilde{h}_k$, along with the low-pass image $l_k$ (which is explicitly added to $h_k$ or $\tilde{h}_k$ before the first convolution layer), and may predict if the image was real or generated. At the final scale of the pyramid, the low frequency residual may be sufficiently small that it can be directly modeled with a standard GAN: $\tilde{h}_K$=$G_K(z_K)$ and $D_K$ only has $h_K$ or $\tilde{h}_K$ as input. The framework is illustrated in FIG. 2.

Particular embodiments may break the generation into successive refinements. Note that particular embodiments may not make an attempt to train a network to discriminate between the output of a cascade and a real image; instead, particular embodiments may focus on making each step plausible. Furthermore, the independent training of each pyramid level may have the advantage that it may be far more difficult for the model to memorize training examples—a hazard when high capacity deep networks are used.

Particular embodiments may be trained in an unsupervised manner. However, particular embodiments may also explore variants that utilize class labels. This may be done by adding a 1-hot vector c, indicating class identity, as another conditioning variable for $G_k$ and $D_k$.

Particular embodiments may apply one or more approaches described herein to three datasets: (i) CIFAR10—32×32 pixel color images of 10 different classes, 100 k training samples with tight crops of objects; (ii) STL—96×96 pixel color images of 10 different classes, 100 k training samples (we use the unlabeled portion of data); and (iii) LSUN—~10M images of 10 different natural scene types, downsampled to 64×64 pixels.

In particular embodiments, for each dataset, particular embodiments may use a variety of architectures for {$G_k$, $D_k$}. For all models, the noise vector $z_k$ is drawn from a uniform [−1,1] distribution.

Particular embodiments may use CIFAR10 and STL as datasets. Their initial scale may be as follows: this may operate at 8×8 resolution, using densely connected nets for both $G_K$ & $D_K$ with 2 hidden layers and ReLU non-linearities. $D_K$ may use Dropout and has 600 units/layer vs 1200 for $G_K$. $Z_K$ is a 100-d vector.

Particular embodiments may boost the training set size by taking four 28×28 crops from the original images for CIFAR10. Thus the two subsequent levels of the pyramid may be 8→14 and 14→28. For STL, we have 4 levels going from 8→16→32→64→96. For both datasets, $G_k$ & $D_k$ may be convnets with 3 and 2 layers, respectively. The noise input $z_k$ to $G_k$ may be presented as a 4th "color plane" to low-pass $l_k$, hence its dimensionality may vary with the pyramid level. For CIFAR10, particular embodiments may also use a class conditional version of the model, where a vector c encodes the label. This may be integrated into $G_k$ & $D_k$ by passing it through a linear layer whose output is reshaped into a single plane feature map which is then concatenated with the 1st layer maps. The loss in Eqn. 2 may be trained using SGD with an initial learning rate of 0.02, decreased by a factor of (1+4×$10^5$) at each epoch. Momentum starts at 0.5, increasing by 0.0008 at epoch up to a maximum of 0.8. During training, particular embodiments may monitor log-likelihood using a Parzen-window estimator and retain the best performing model. Training time may depend on the models' size and pyramid level, with smaller models taking hours to train and larger models taking several days.

In particular embodiments, to describe a log-likelihood computation in a model in particular embodiments, a two-scale pyramid may be used for explanation purposes. Given a (vectorized) j×j image I, denote by l=d(I) the coarsened image, and h=I−u(d(I)) to be the high pass. In this section, to simplify the computations, a slightly different u operator may be used, instead of the one used to generate the images in normal operation. Namely, let d(I) be the mean over each disjoint block of 2×2 pixels, and let u be the operator that removes the mean from each 2×2 block. Since u has rank $3d^2/4$, in this section, h may be expressed in an orthonormal basis of the range of u, then the (linear) mapping from I to (l,h) is unitary. The probability density p on $R^{d^2}$ becomes $$p(I)=q_0(l,h)q_1(l)=q_0(d(I),h(I))q_1(d(I)); \quad (7)$$

Suppose that $q_i \geq 0$, $\int q_1(l)dl=1$, and for each fixed l, $\int q_0(l \cdot h)dh=1$. Then it is determined that p has unit integral:

$$\int p \, dI = \int q_0(d(I),h(I))q_1(d(I))dI = \iint q_0(l,h)q_1(l)dl\,dh = 1. \quad (8)$$

In particular embodiments, $q_i$ may be defined with Parzen window approximations to the densities of each of the scales. For $q_1$, take a set of training samples $l_1, \ldots, l_{N_0}$, and construct the density function $q_1(l) \sim \sum_{i=1}^{N_1} e^{\|l-l_i\|^2/\sigma_1}$. Fix l=d (I) to define $q_0(I)=q_0(l,h) \sim \sum_{i=1}^{N_0} e^{\|h-h_i\|^2/\sigma_0}$. For pyramids with more levels, continue in the same way for each of the finer scales. Note that the true low pass is used at each scale, and the true high pass is measured against the high pass samples generated from the model. Thus for a pyramid with K levels, the final log likelihood will be: $\log(q_K(l_K))+E_{k-0}^{K-1} \log(q_k(l_k,h_k))$.

Particular embodiments may use a LSUN dataset. The larger size of this dataset may allow allows for training a separate LAPGAN model for each the 10 different scene classes. In particular embodiments, the four subsequent scales 4→8→16→32→64 may use a common architecture for $G_k$ & $D_k$ at each level. $G_k$ may be a 5-layer convent with {64, 368, 128, 224} feature maps and a linear output layer. 7×7 filters, ReLUs, batch normalization and Dropout are used at each hidden layer. $D_k$ may have 3 hidden layers with {48, 448, 416} maps plus a sigmoid output. Note that $G_k$ and $D_k$ may be substantially larger than those used for CIFAR10 and STL, as afforded by the larger training set.

Particular embodiments may provide a conceptually simple generative model that may be able to produce high-quality sample images that may be both qualitatively and quantitatively better than other deep generative modeling approaches. Any "global" notion of fidelity may be given up, and instead the generation may be broken into plausible successive refinements. Other signal modalities having a multiscale structure may benefit from a similar approach.

In particular embodiments, a class conditional (CC) LAP-GAN model may be provided in addition to a LAPGAN model and a standard GAN model. Samples from the class conditional LAPGAN may be organized by class. The LAPGAN samples may improve upon the standard GAN samples. They may appear more object-like and may have more clearly defined edges. Conditioning on a class label may improve the generations as evidenced by the clear object structure in the conditional LAPGAN samples. The quality of these samples may compare favorably with those from other DRAW models.

Figure 3:
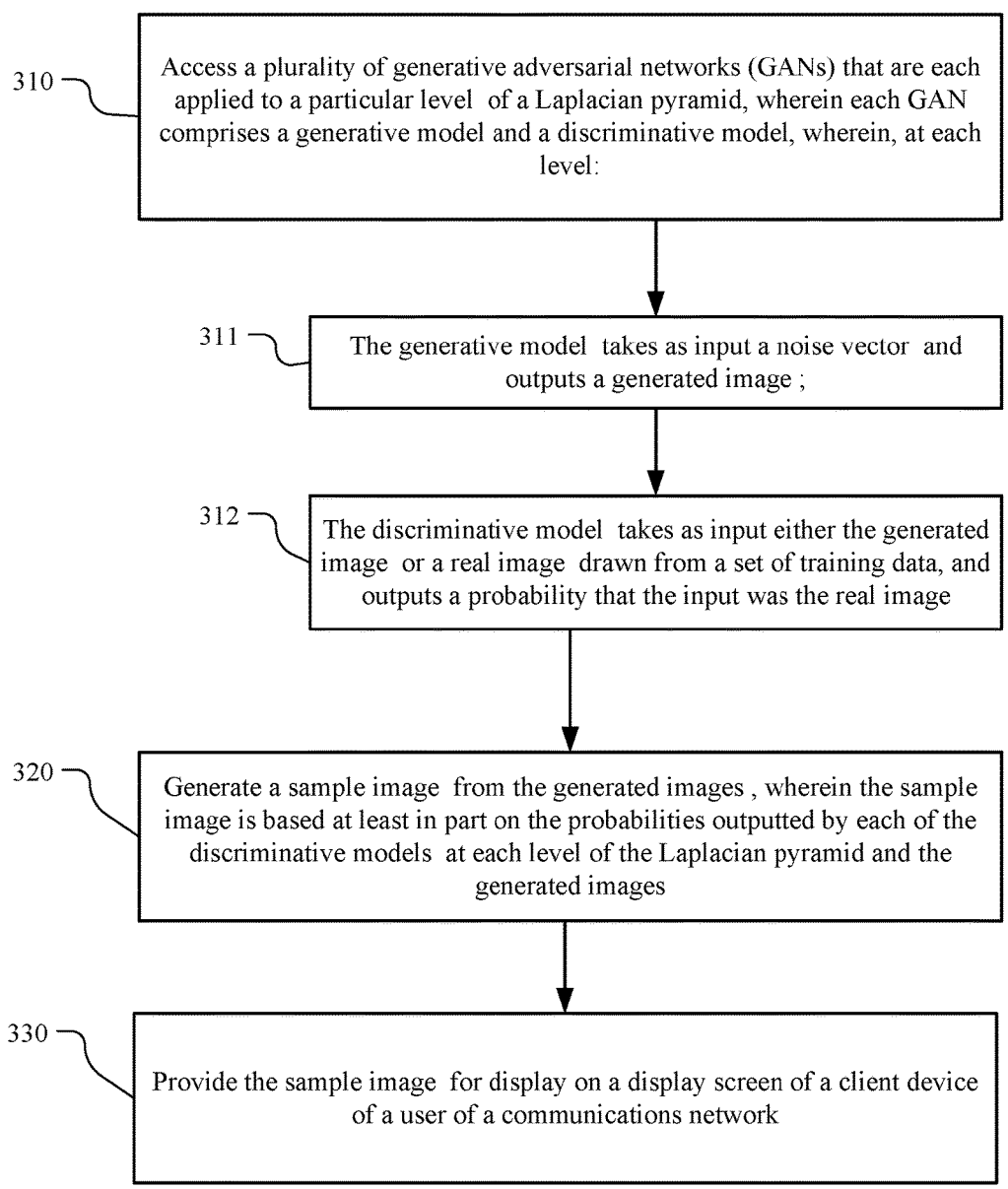
FIG. 3 illustrates an example method for generating a sample image from a set of generated images produced by an example Laplacian generative adversarial network model.

FIG. 3 illustrates an example method 300 for generating a sample image from a set of generated images produced by an example Laplacian generative adversarial network model. The method may begin at step 310, where one or more computing devices may access a plurality of generative adversarial networks (GANs) that are each applied to a particular level k of a Laplacian pyramid, wherein each GAN may comprise a generative model $G_k$ and a discriminative model $D_k$. At each level k: (1) the generative model $G_k$ may take as input a noise vector $z_k$ and outputs a generated image $\tilde{h}_k$; and (2) the discriminative model $D_k$ may take as input either the generated image $\tilde{h}_k$ or a real image $h_k$ drawn from a set of training data, and outputs a probability that the input was the real image $h_k$. At step 320, one or more computing devices may generate a sample image $\tilde{I}_k$ from the generated images $\tilde{h}_k$, wherein the sample image is based at least in part on the probabilities outputted by each of the discriminative models $D_k$ at each level k of the Laplacian pyramid and the generated images $\tilde{h}_k$. At step 330, one or more computing devices may provide the sample image $\tilde{I}_k$ for display on a display screen of a client device of a user of a communications network. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for generating a sample image from a set of generated images produced by an example Laplacian generative adversarial network model including the particular steps of the method of FIG. 3, this disclosure contemplates any suitable method for generating a sample image from a set of generated images produced by an example Laplacian generative adversarial network model including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
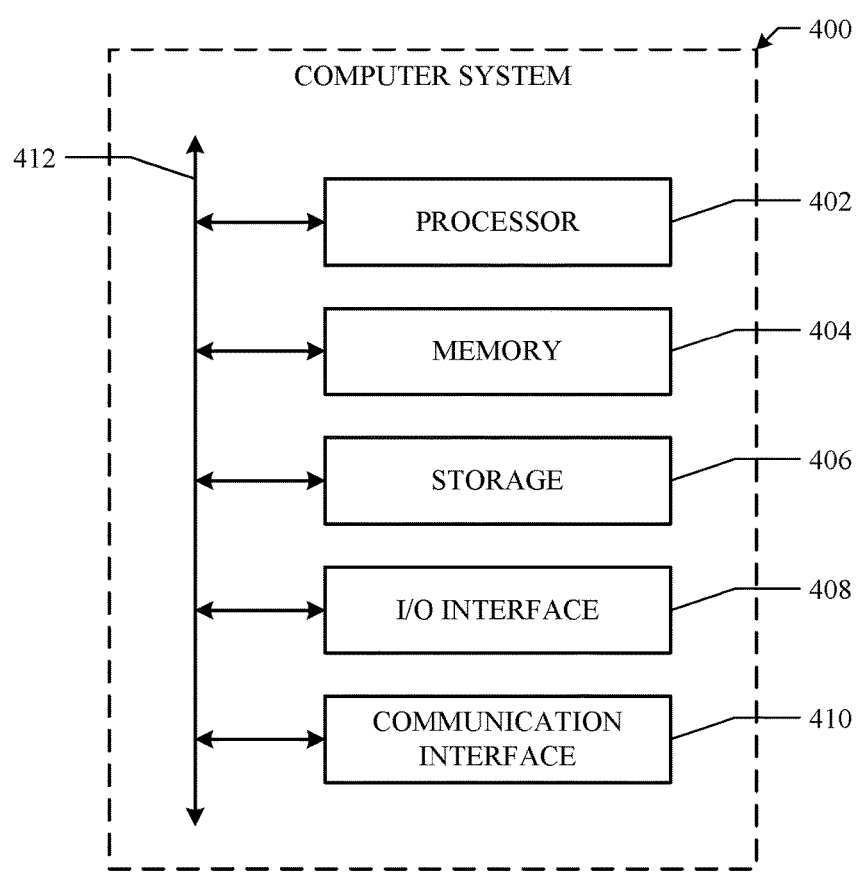
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
   accessing a plurality of generative adversarial networks (GANs) that are each applied to a particular level k of a Laplacian pyramid, wherein each GAN comprises a generative model $G_k$ and a discriminative model $D_k$, wherein, at each level k:
   the generative model $G_k$ takes as input a noise vector $z_k$ and outputs a generated image $\tilde{h}_k$; and
   the discriminative model $D_k$ takes as input either the generated image $\tilde{h}_k$ or a real image $h_k$ drawn from a set of training data, and outputs a probability that the input was the real image $h_k$, wherein the set of training data comprises:
   a first set of color images of a plurality of objects belonging to a plurality of different classes, wherein the images in the first set are tightly cropped around the respective objects; and
   a second set of color images of a plurality of natural scene types, wherein the images in the second set are not tightly cropped around any object:

generating a sample image $\tilde{I}_k$ from the generated images $\tilde{h}_k$, wherein the sample image is based at least in part on the probabilities outputted by each of the discriminative models $D_k$ at each level k of the Laplacian pyramid and the generated images $\tilde{h}_k$; and providing the sample image $\tilde{I}_k$ for display on a display screen of a client device of a user of a communications network.

2. The method of claim 1, wherein generating the sample image $\tilde{I}_k$ from the generated images $\tilde{h}_k$ further comprises:
applying an upsampling operator u(.) to at least one of the generated images $\tilde{h}_k$; and
combining the upsampled image $\tilde{h}_k$ with an image $I_{k+1}$ generated by a generative model $G_{k+1}$, wherein the image $I_{k+1}$ was generated at level k+1 in the Laplacian pyramid.

3. The method of claim 2, wherein the sample image $\tilde{I}_k$ is generated using the equation $\tilde{I}_k = u(\tilde{I}_{k+1}) + \tilde{h}_k$.

4. The method of claim 1, wherein the generated images $\tilde{h}_k$ are generated in a coarse-to-fine fashion.

5. The method of claim 1, wherein each level k in the Laplacian pyramid corresponds to a generated image $\tilde{h}_k$ that comprises a particular number of pixels, wherein as k increases, the number of pixels in $\tilde{h}_k$ decreases.

6. The method of claim 1, wherein the generative model $G_k$ and the discriminative model $D_k$ each take an additional vector of information as input.

7. The method of claim 6, wherein the additional vector of information is a generated image $l_k$ created by a conditional GAN model.

8. One or more computer-readable non-transitory storage media embodying software that is operable when executed to:
access a plurality of generative adversarial networks (GANs) that are each applied to a particular level k of a Laplacian pyramid, wherein each GAN comprises a generative model G and a discriminative model $D_k$, wherein, at each level k:
the generative model $G_k$ takes as input a noise vector $z_k$ and outputs a generated image $\tilde{h}_k$; and
the discriminative model $D_k$ takes as input either the generated image $\tilde{h}_k$ or a real image $h_k$ drawn from a set of training data, and outputs a probability that the input was the real image $h_k$, wherein the set of training data comprises:
a first set of color images of a plurality of objects belonging to a plurality of different classes, wherein the images in the first set are tightly cropped around the respective objects; and
a second set of color images of a plurality of natural scene types, wherein the images in the second set are not tightly cropped around any object;
generate a sample image $\tilde{I}_k$ from the generated images $\tilde{h}_k$, wherein the sample image is based at least in part on the probabilities outputted by each of the discriminative models $D_k$ at each level k of the Laplacian pyramid and the generated images $\tilde{h}_k$; and
provide the sample image $\tilde{I}_k$ for display on a display screen of a client device of a user of a communications network.

9. The media of claim 8, wherein generating the sample image $\tilde{I}_k$ from the generated images $\tilde{h}_k$, further comprises:
applying an upsampling operator u(.) to at least one of the generated images $\tilde{h}_k$; and
combining the upsampled image $\tilde{h}_k$ with an image $I_{k+1}$ generated by a generative model $G_{k+1}$, wherein the image $I_{k+1}$ was generated at level k+1 in the Laplacian pyramid.

10. The media of claim 9, wherein the sample image $\tilde{I}_k$ is generated using the equation $\tilde{I}_k = u(\tilde{I}_{k+1}) + \tilde{h}_k$.

11. The media of claim 8, wherein the generated images $\tilde{h}_k$ are generated in a coarse-to-fine fashion.

12. The media of claim 8, wherein each level k in the Laplacian pyramid corresponds to a generated image $\tilde{h}_k$ that comprises a particular number of pixels, wherein as k increases, the number of pixels in $\tilde{h}_k$ decreases.

13. The media of claim 8, wherein the generative model $G_k$ and the discriminative model $D_k$ each take an additional vector of information as input.

14. The media of claim 13, wherein the additional vector of information is a generated image $l_k$ created by a conditional GAN model.

15. A system comprising:
one or more processors; and
one or more computer-readable non-transitory storage media coupled to one or more of the processors and comprising instructions operable when executed by one or more of the processors to cause the system to:
access a plurality of generative adversarial networks (GANs) that are each applied to a particular level k of a Laplacian pyramid, wherein each GAN comprises a generative model $G_k$ and a discriminative model $D_k$, wherein, at each level k:
the generative model $G_k$ takes as input a noise vector $z_k$ and outputs a generated image $\tilde{h}_k$; and
the discriminative model $D_k$ takes as input either the generated image $\tilde{h}_k$ or a real image $h_k$ drawn from a set of training data, and outputs a probability that the input was the real image $h_k$, wherein the set of training data comprises:
a first set of color images of a plurality of objects belonging to a plurality of different classes, wherein the images in the first set are tightly cropped around the respective objects; and
a second set of color images of a plurality of natural scene types, wherein the images in the second set are not tightly cropped around any object:
generate a sample image $\tilde{I}_k$ from the generated images $\tilde{h}_k$, wherein the sample image is based at least in part on the probabilities outputted by each of the discriminative models $D_k$ at each level k of the Laplacian pyramid and the generated images $\tilde{h}_k$; and
provide the sample image $\tilde{I}_k$ for display on a display screen of a client device of a user of a communications network.

16. The system of claim 15, wherein generating the sample image $\tilde{I}_k$ from the generated images $\tilde{h}_k$ further comprises:
applying an upsampling operator u(.) to at least one of the generated images $\tilde{h}_k$; and
combining the upsampled image $\tilde{h}_k$ with an image $I_{k+1}$ generated by a generative model $G_{k+1}$, wherein the image $I_{k+1}$ was generated at level k+1 in the Laplacian pyramid.

17. The system of claim 16, wherein the sample image $\tilde{I}_k$ is generated using the equation $\tilde{I}_k = u(\tilde{I}_{k+1}) + \tilde{h}_k$.

18. The system of claim 15, wherein the generated images $\tilde{h}_k$ are generated in a coarse-to-fine fashion.

19. The system of claim 15, wherein each level k in the Laplacian pyramid corresponds to a generated image $\tilde{h}_k$ that comprises a particular number of pixels, wherein as k increases, the number of pixels in $\tilde{h}_k$ decreases.

20. The system of claim 15, wherein the generative model $G_k$ and the discriminative model $D_k$ each take an additional vector of information as input.

* * * * *